(12) United States Patent
Choi et al.

(10) Patent No.: US 10,308,310 B2
(45) Date of Patent: Jun. 4, 2019

(54) WHEEL MOUNTING MEMBER HAVING DAMPING STRUCTURE AND STAMPING FRAME INCLUDING THE SAME

(71) Applicants: Hyundai Motor Company, Seoul (KR); Kia Motors Corporation, Seoul (KR)

(72) Inventors: Jungnam Choi, Seongnam-si (KR); Sung Dae Lim, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 162 days.

(21) Appl. No.: 15/624,415

(22) Filed: Jun. 15, 2017

(65) Prior Publication Data
US 2018/0154976 A1    Jun. 7, 2018

(30) Foreign Application Priority Data
Dec. 6, 2016    (KR) .................. 10-2016-0165278

(51) Int. Cl.
*B62K 25/04*    (2006.01)
*B62K 19/20*    (2006.01)

(52) U.S. Cl.
CPC ............ *B62K 25/04* (2013.01); *B62K 19/20* (2013.01); *B62K 2201/04* (2013.01)

(58) Field of Classification Search
CPC ............................... B62K 25/04; B62K 25/08
See application file for complete search history.

(56) References Cited

U.S. PATENT DOCUMENTS

| | | | | |
|---|---|---|---|---|
| 4,856,802 A * | 8/1989 | Schilplin | ............... | B62K 25/02 280/288 |
| 5,096,215 A * | 3/1992 | Chonan | ................. | B62K 25/02 280/281.1 |
| 7,854,441 B2 * | 12/2010 | Scurlock | ............... | B62K 25/02 248/200 |
| 8,087,686 B1 * | 1/2012 | Carroll | .................. | B62K 19/30 280/274 |
| 8,740,239 B2 * | 6/2014 | Lumpkin | ............... | B62K 19/30 280/285 |
| 9,415,828 B2 * | 8/2016 | Norstad | ................. | B62K 19/24 |
| 9,545,971 B2 * | 1/2017 | Beutner | .................. | B62K 3/02 |
| 2011/0042917 A1 * | 2/2011 | Cleveland | ............. | B62K 19/24 280/288 |

(Continued)

FOREIGN PATENT DOCUMENTS

JP    3099085 U    3/2004
KR    10-1556383 B1    9/2015

(Continued)

*Primary Examiner* — Tony H Winner
(74) *Attorney, Agent, or Firm* — Morgan, Lewis & Bockius LLP

(57) ABSTRACT

A wheel mounting member having a damping structure may include a dropout in which an axle insertion groove is formed at one side of a lower portion thereof, wherein a guide slot may be formed in a predetermined direction at a predetermined distance from the axle insertion groove; a bracket in which a protrusion inserted into the guide slot is formed at a lateral surface thereof; and an elastic member that is inserted into the guide slot and elastically supports the protrusion, wherein the elastic member may absorb impact transmitted to the dropout.

14 Claims, 7 Drawing Sheets

(56) References Cited

U.S. PATENT DOCUMENTS

2011/0316251 A1* 12/2011 Lumpkin .............. B62K 19/30
                                                280/285
2012/0274042 A1* 11/2012 Harris ................... B62K 19/24
                                                280/288
2018/0170477 A1*  6/2018 Choi ..................... B62K 25/02

FOREIGN PATENT DOCUMENTS

| KR | 10-1556384 B1 | 9/2015 |
| KR | 10-2016-0009814 A | 1/2016 |
| KR | 10-2016-0045046 A | 4/2016 |

* cited by examiner

WHEEL MOUNTING MEMBER HAVING DAMPING STRUCTURE AND STAMPING FRAME INCLUDING THE SAME

CROSS-REFERENCE TO RELATED APPLICATION

The present application claims priority to Korean Patent Application No. 10-2016-0165278 filed on Dec. 6, 2016, the entire contents of which is incorporated herein for all purposes by this reference.

BACKGROUND OF THE INVENTION

Field of the Invention

The present invention relates to a wheel mounting member having a damping structure and a stamping frame including the same in which a bicycle frame is formed by respectively stamping right and left panels and then bonding them, and a stamping frame is mounted thereon.

Description of Related Art

A typical bicycle frame includes a head tube, a seat tube, a top tube, a down tube, a seat stay, and a chain stay.

A steering wheel connection body is connected to an upper end portion of the head tube, a front wheel rotary connection body is connected to a lower end portion of the head tube, a saddle connection body is connected to an upper end portion of the seat tube, and a chain drive body is connected to a lower end portion of the seat tube.

The top tube and the down tube connect and support the head tube and the seat tube, and the seat stay and the chain stay connect and support a rear wheel rotary connection body and the seat tube.

The bicycle frame may include both the top tube and the down tube, but, alternatively, one main tube may be connected between the head tube and the seat tube.

The typical bicycle frame is manufactured by respectively cutting a top tube, a down tube, and a seat tube using a tube as a base material and then respectively welding them, but since it is difficult to automatically perform such manufacturing processes, productivity may deteriorate and manufacturing cost may increase.

Therefore, research for improving production efficiency and durability of the bicycle frame through a process of manufacturing a bicycle frame by hot-stamping a plate member and then bonding left and right portions of the hot-stamped plate member has recently progressed.

In addition, a full suspension frame manufactured by separately forming a front triangular frame and a rear triangular frame and then adding a suspension therebetween has been recently introduced, and the full suspension frame may absorb a shock transmitted from a road surface through the suspension.

However, due to the separating of the frames and the adding of the suspension therebetween, a structure thereof may be complicated, productivity may deteriorate, and weight and price may increase.

Meanwhile, phenomena such as bobbing, kickback, brake jack, and squatting occur in a full-suspension bicycle, and studies to solve these phenomena have progressed.

Here, the bobbing refers to a phenomenon that a suspension is unnecessarily overworked due to pedaling or braking, and the kickback refers to a phenomenon that a swing arm pulls a chain back to reverse a crank while the swing arm is bent by impact on a road surface and then restored. The brake jack refers to a phenomenon that when a rear brake operates, a rear brake force is transmitted to a rear shock absorber through a swing arm to compress the rear shock absorber such that shock absorbing ability is lowered as the rear shock absorber becomes rigid, and the squatting is a phenomenon that a rear end of a bicycle compresses a suspension when the bicycle starts up in a rush, causing the suspension to sag.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a wheel mounting member having a damping structure and a stamping frame including the same that may minimize weight increase of a bicycle and may apply a shock absorbing structure to a frame while simplifying a structure thereof.

Various aspects of the present invention are directed to providing a wheel mounting member having a damping structure, including: a dropout in which an axle insertion groove is formed at one side of a lower portion thereof, wherein a guide slot may be formed in a predetermined direction at a predetermined distance from the axle insertion groove; a bracket in which a protrusion inserted into the guide slot is formed at a lateral surface thereof; and an elastic member that is inserted into the guide slot and elastically supports the protrusion, wherein the elastic member may absorb impact transmitted to the dropout.

The elastic member may be respectively disposed at opposite sides of the guide slot based on the protrusion.

The guide slot may be formed at a predetermined angle with respect to a horizontal line.

The predetermined angle may be in a range of about 70 degrees to about 90 degrees.

The bracket may be disposed on one surface of the dropout, and a cap may be disposed on the other surface of the dropout and may be fastened to the protrusion.

A guide rail may be formed along the guide slot in the other surface of the dropout, and the cap may be slid along the guide rail.

Various aspects of the present invention are directed to providing a wheel mounting member having a damping structure, including: a dropout in which an axle insertion groove into which an axle disposed at a rotational center portion of a wheel is inserted is formed at one side of a lower portion thereof and in which a protrusion is formed at one surface thereof; a bracket in which a guide slot into which the protrusion is inserted is formed; and an elastic member that is inserted into the guide slot and elastically supports the protrusion, wherein the elastic member may absorb impact transmitted to the dropout.

The elastic member may respectively be disposed at opposite sides of the guide slot based on the protrusion, the guide slot may be formed at a predetermined angle with respect to a horizontal line, and the predetermined angle may be in a range of about 70 degrees to about 90 degrees.

The dropout may be disposed on one surface of the bracket, and a cap may be disposed on the other surface of the bracket and be fastened to the protrusion.

A guide rail may be formed along the guide slot in the other surface of the dropout, and the cap may be slid along the guide rail.

Various aspects of the present invention are directed to providing a stamping frame including: a wheel mounting member having a damping structure; and a stamping frame that is formed by stamping-forming left and right panels and then bonding them to each other and in which the wheel mounting member is disposed at one side thereof.

According to the exemplary embodiment of the present invention, it is possible to reduce impact transmitted to a rider through relative movement between a fixed bracket fixed to a frame and a dropout provided with an axle insertion groove.

In addition, according to the exemplary embodiment of the present invention, by adjusting a setting angle of a damping angle, it is possible to reduce the bobbing phenomenon and the brake jack phenomenon in the full suspension bicycle.

Further, a damping effect corresponding to the full suspension frame may be realized in a hard tail frame, and a damping effect may be easily realized by replacing only a wheel mounting member including a dropout.

It is possible to minimize the weight and to reduce the cost by forming a guide slot between a dropout and a fixing bracket and through structures of a protrusion inserted into the guide slot and an elastic member elastically supporting the protrusion.

Moreover, by applying a damping structure to a wheel mounting member, it is possible to minimize impact transmitted to a frame, increasing durability of the frame.

The methods and apparatuses of the present invention have other features and advantages which will be apparent from or are set forth in more detail in the accompanying drawings, which are incorporated herein, and the following Detailed Description, which together to explain certain principles of the present invention.

Figure 1:
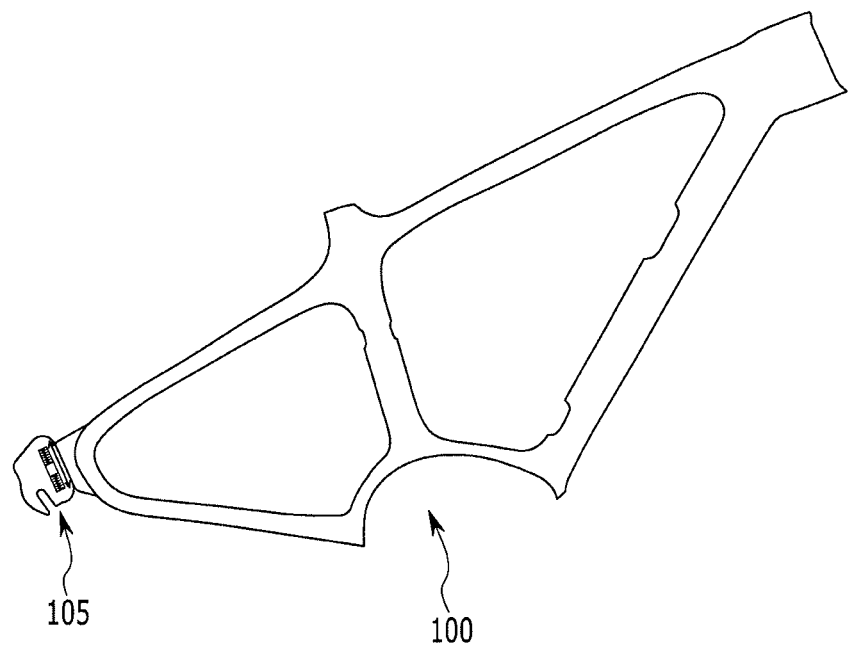
FIG. 1 illustrates a perspective view of a stamping frame according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, the size and thickness of each component illustrated in the drawings are arbitrarily shown for ease of description and the present invention is not limited thereto, and the thicknesses of portions and regions are exaggerated for clarity.

In addition, parts that are irrelevant to the description are omitted to clearly describe the exemplary embodiments of the present invention, and like reference numerals designate like elements throughout the specification.

In the following description, dividing names of components into first, second, and the like is to divide the names because the names of the components are the same, and an order thereof is not particularly limited.

FIG. 1 illustrates a perspective view of a stamping frame according to an exemplary embodiment of the present invention.

Referring to FIG. 1, a wheel mounting member 105 is provided at a rear end portion of the stamping frame 100. The stamping frame 100 is formed to be provided with flanges at opposite end portions thereof through a stamping press forming process so that two trim-formed panels are symmetrical to each other, and it is welded and fixed along edge portions of respective flange of the two panels. A head tube, a seat tube, and a sprocket hub may be interposed and welded between the two panels to be integrally or monolithically manufactured. A rear wheel is mounted on the wheel mounting member 105.

The structure and the manufacturing method of the stamping frame 100 and the structure of the rear wheel are known technologies, thus a detailed description thereof will be omitted.

In the exemplary embodiment of the present invention, by applying a damping structure to the wheel mounting member 105 mounted on the stamping frame 100, it is possible to absorb impact transmitted to the rear wheel, and by realizing the damping structure without separating the frames, it is possible to minimize a weight increase and to reduce cost.

Figure 2:
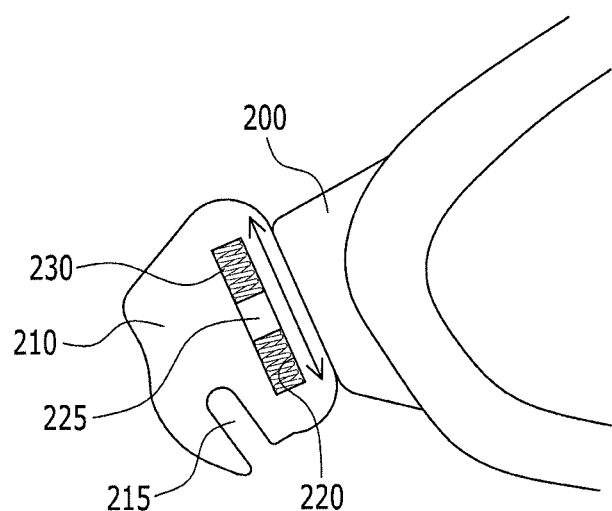
FIG. 2 illustrates a side view of a wheel mounting member having a damping structure mounted on a frame according to an exemplary embodiment of the present invention.

FIG. 2 illustrates a side view of a wheel mounting member having a damping structure mounted on a frame according to an exemplary embodiment of the present invention.

Referring to FIG. 2, the wheel mounting member 105 includes a fixing bracket 200 fixed to the stamping frame 100 and a dropout 210 combined with the fixing bracket 200.

An axle insertion groove 215 on which an hub axle is mounted is formed in a lower portion of the dropout 210, and the axle insertion groove 215 has an opened lower structure and a structure that is inclined at a predetermined angle in a front direction.

A guide slot 220 is formed at the dropout 210 in a predetermined direction (vertical direction), and a protrusion 225 protruding from the fixing bracket 200 is inserted into the guide slot 220.

An elastic member 230 elastically supporting an upper or lower portion of the protrusion 225 is provided inside the guide slot 220. The elastic member 230 may include a lower elastic member provided at a lower portion of the guide slot 220 to upwardly support the protrusion 225, and an upper elastic member provided at an upper portion of the guide slot 220 to downwardly support the protrusion 225.

Accordingly, the dropout 210 may move up and down by a predetermined angle through the protrusion 225 and the guide slot 220, and in the instant case, it is possible to absorb impact transmitted to the rear wheel through tension compression of the elastic member 230.

Figure 3:
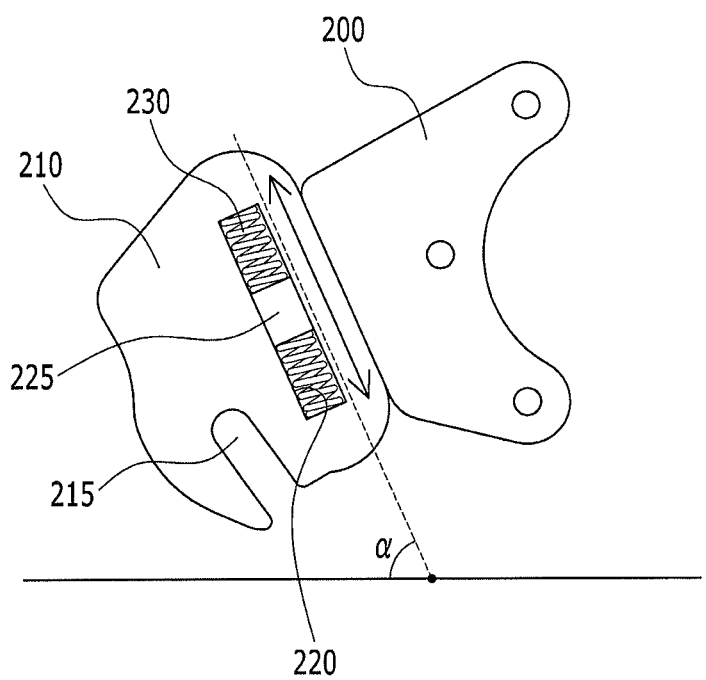
FIG. 3 illustrates a detailed side view of a wheel mounting member having a damping structure according to an exemplary embodiment of the present invention.

FIG. 3 illustrates a detailed side view of a wheel mounting member having a damping structure according to an exemplary embodiment of the present invention.

Referring to FIG. 3, in a state in which the fixing bracket 200 and the dropout 210 are fastened, the guide slot 220 is formed at a predetermined angle (a).

Specifically, when an imaginary horizontal line is formed, the predetermined angle (a) may range from about 70 degrees to about 90 degrees with respect to the imaginary horizontal line.

Accordingly, in a state in which the dropout 210 is fastened to the fixing bracket 200, the dropout 210 moves along the guide slot 220 to absorb impact, and stably maintains tension of a chain between a sprocket and a crank.

Figure 4:
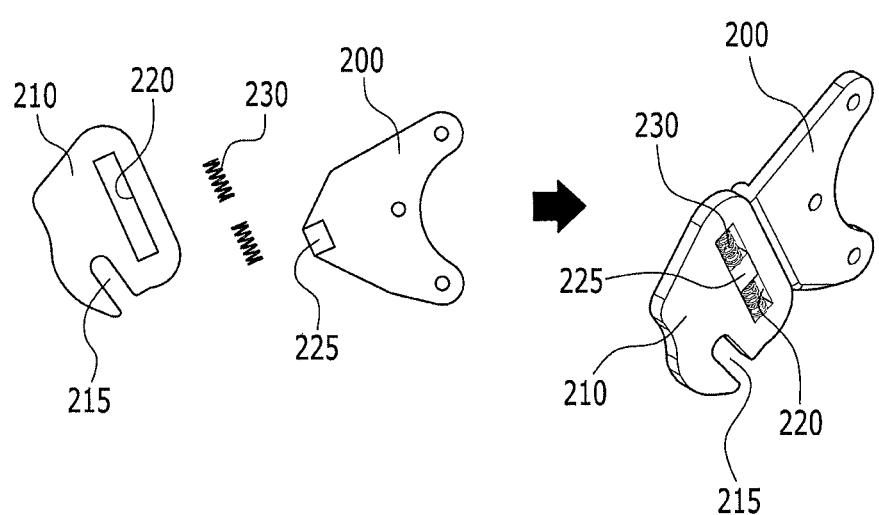
FIG. 4 illustrates an exploded side and perspective view of a wheel mounting member having a damping structure according to an exemplary embodiment of the present invention.

FIG. 4 illustrates an exploded side and perspective view of a wheel mounting member having a damping structure according to an exemplary embodiment of the present invention.

Referring to FIG. 4, the wheel mounting member 105 may include the dropout 210, the axle insertion groove 215, the elastic member 230, the guide protrusion 225, and the fixing bracket 200.

The fixing bracket 200 may be fixed to the stamping frame 100 with a fixing bolt or by welding, and the guide protrusion 225 protrudes from one surface of the fixing bracket 200.

The guide slot 220 is formed to have a predetermined angle in the dropout 210, one surface of a front end portion of the dropout 210 is disposed on one side of the fixing bracket 200, and the protrusion 225 is inserted into the guide slot 220.

The elastic members 230 are respectively disposed at an upper portion and a lower portion of the guide slot 220, and they are elastically supported at a top portion and a bottom portion of the protrusion 225.

Figure 5:
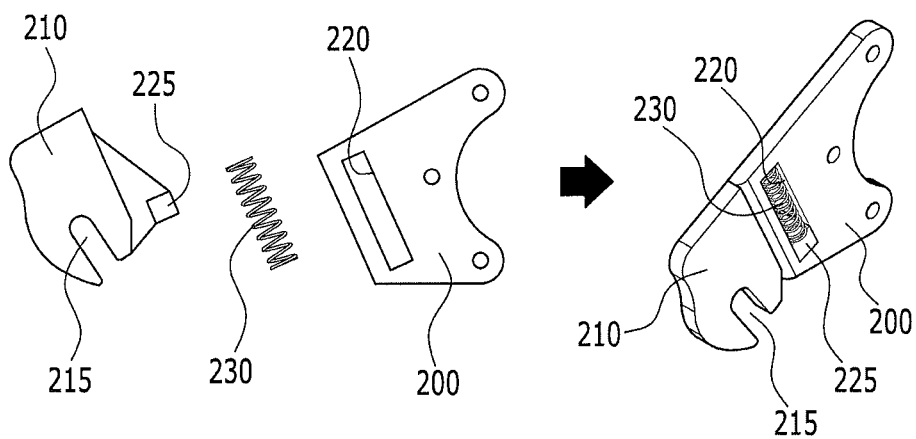
FIG. 5 illustrates an exploded side and perspective view of a wheel mounting member having a damping structure according to another exemplary embodiment of the present invention.

FIG. 5 illustrates an exploded side and perspective view of a wheel mounting member having a damping structure according to another exemplary embodiment of the present invention.

In FIG. 5, parts that are different from those of FIG. 4 will be described. Referring to FIG. 5, the wheel mounting member 105 includes the dropout 210, the axle insertion groove 215, the guide protrusion 225, the elastic member 230, and the fixing bracket 200.

The guide protrusion 225 protrudes from one surface of a front end portion of the dropout 210 made of porcelain, and the guide slot 220 is formed in the fixing bracket 200 to have a predetermined angle.

The guide protrusion 225 of the dropout 210 is inserted into the guide slot 220, and the elastic member 230 is disposed inside the guide slot 220 to be elastically supported at a bottom portion of the guide protrusion 225.

When the dropout 210 moves upwardly, the elastic member 230 may be compressed, and when the dropout 210 moves downwardly, the elastic member 230 may be stretched.

Figure 6:
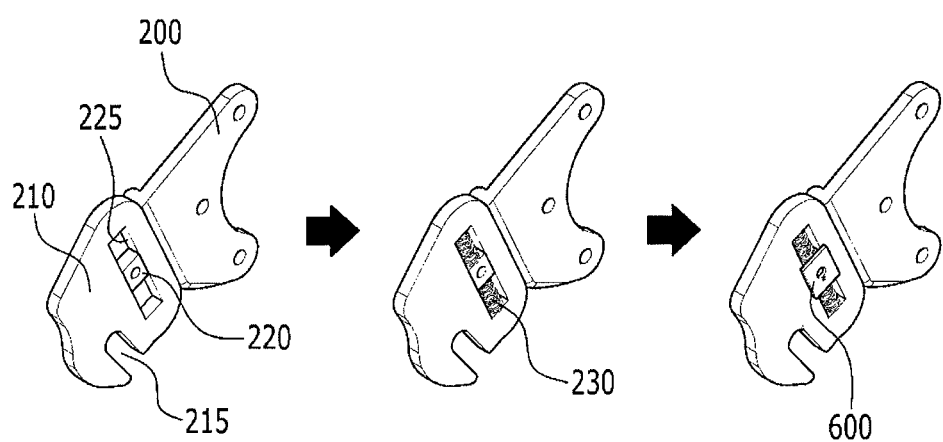
FIG. 6 illustrates a perspective view of an assembly sequence of a wheel mounting member having a damping structure according to another exemplary embodiment of the present invention.

FIG. 6 illustrates a perspective view of an assembly sequence of a wheel mounting member having a damping structure according to another exemplary embodiment of the present invention. Compared with FIG. 6 and FIG. 5, differences will be described.

Referring to FIG. 6, the fixing bracket 200 and the dropout 210 are combined with each other so that the protrusion 225 of the fixing bracket 200 is positioned in a center of the guide slot 220, and the elastic member 230 is inserted into an upper portion and a lower portion of the protrusion 225, respectively.

Then, a cap 600 is fastened to the protrusion 225. An external diameter of the cap 600 is greater than an internal diameter of the guide slot 220, and the cap 600 prevents the dropout 210 from being detached from the fixing bracket 200.

Figure 7:
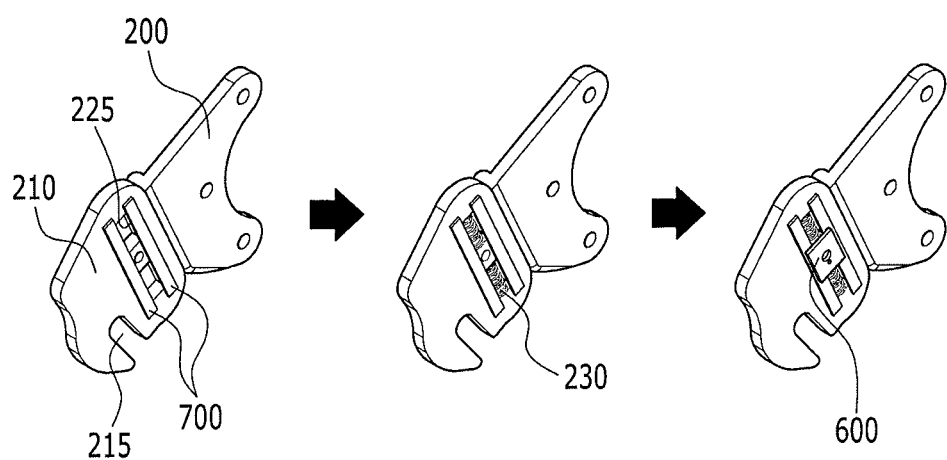
FIG. 7 illustrates a perspective view of an assembly sequence of a wheel mounting member having a damping structure according to a further exemplary embodiment of the present invention.

FIG. 7 illustrates a perspective view of an assembly sequence of a wheel mounting member having a damping structure according to a further exemplary embodiment of the present invention. Compared with FIG. 7 and FIG. 6, differences will be described.

Referring to FIG. 7, guide rails 700 are provided at opposite sides of the guide slot 220 in one surface of the dropout 210.

The fixing bracket 200 and the dropout 210 are fastened to each other, and then the cap 600 and the protrusion 225 are fastened to each other. Thus, the cap 600 is slid in the guide rails 700, realizing a stable sliding structure between the dropout 210 and the fixing bracket 200.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel mounting member having a damping structure, comprising:
   a dropout in which an axle insertion groove is formed at a first side of a lower portion of the dropout, wherein a guide opening is formed in a predetermined direction at a predetermined distance from the axle insertion groove;
   a bracket in which a protrusion slidably inserted into the guide opening is formed at a lateral surface of the bracket; and
   an elastic member that is configured to be inserted into the guide opening and to elastically support at least one side of the protrusion,
   wherein the elastic member is configured to absorb impact transmitted to the dropout.

2. The wheel mounting member having the damping structure of claim 1, wherein
   the elastic member includes a plurality of elastic members which is respectively disposed at a first opposite side and a second opposite side of the guide opening based on the protrusion.

3. The wheel mounting member having the damping structure of claim 1, wherein
   the guide opening is formed at a predetermined angle with respect to an imaginary horizontal line.

4. The wheel mounting member having the damping structure of claim 3, wherein
   the predetermined angle is in a range of about 70 degrees to about 90 degrees.

5. The wheel mounting member having the damping structure of claim 1, wherein
   the bracket is disposed on a first surface of the dropout, and
   a cap is disposed on a second surface of the dropout and is fastened to the protrusion.

6. The wheel mounting member having the damping structure of claim 5, wherein
   a guide rail is formed along the guide opening in the second surface of the dropout, and
   the cap is slid on the guide rail.

7. The wheel mounting member having the damping structure of claim 5, wherein
   a guide rail includes a plurality of guides formed along a first side and a second side of the guide opening in the second surface of the dropout, and
   the cap is slid on the guide rails.

8. A stamping frame including the wheel mounting member of the claim 1 having the damping structure, comprising:
   a stamping frame that is formed by stamping-forming first and second panels and then bonding the first and second panels to each other and in which the wheel mounting member is disposed at a first side of the stamping frame.

9. A wheel mounting member having a damping structure, comprising:
   a dropout in which an axle insertion groove into which an axle disposed at a rotational center portion of a wheel is configured to be inserted is formed at a first side of a lower portion of the dropout and in which a protrusion is formed at a first surface of the dropout;
   a bracket in which a guide opening into which the protrusion is configured to be slidably inserted is formed; and
   an elastic member that is configured to be inserted into the guide opening and to elastically support at least a side of the protrusion,
   wherein the elastic member is configured to absorb impact transmitted to the dropout.

10. The wheel mounting member having the damping structure of claim 9, wherein
    the dropout is disposed on a first surface of the bracket, and
    a cap is disposed on a second surface of the bracket and is fastened to the protrusion.

11. The wheel mounting member having the damping structure of claim 10, wherein
    a guide rail is formed along the guide opening in the second surface of the dropout, and
    the cap is slid on the guide rail.

12. The wheel mounting member having the damping structure of claim 10, wherein
    a guide rail includes a plurality of guides formed along a first side and a second side of the guide opening in the second surface of the dropout, and
    the cap is slid on the guide rails.

13. The wheel mounting member having the damping structure of claim 9, wherein
    the elastic member includes a plurality of elastic members which are respectively disposed at a first opposite side and a second opposite side of the guide opening based on the protrusion,
    the guide opening is formed at a predetermined angle with respect to an imaginary horizontal line, and
    the predetermined angle is in a range of about 70 degrees to about 90 degrees.

14. A stamping frame including the wheel mounting member of the claim 9 having the damping structure, comprising:
    a stamping frame that is formed by stamping-forming first and second panels and then bonding the first and second panels to each other and in which the wheel mounting member is disposed at a first side of the stamping frame.

* * * * *